United States Patent [19]

Kimura et al.

[11] Patent Number: 5,635,557
[45] Date of Patent: Jun. 3, 1997

[54] POLYPROPYLENE COMPOSITION AND STRETCHED FILM THEREOF

[75] Inventors: Junichi Kimura, Toyonaka; Minoru Takane, Sodegaura; Yoichi Obata, Ichihara; Hiroyuki Tanimura, Sodegaura, all of Japan

[73] Assignee: Sumitomo Chemical Company, Limited, Osaka, Japan

[21] Appl. No.: 361,336

[22] Filed: Dec. 21, 1994

[30] Foreign Application Priority Data

Dec. 22, 1993 [JP] Japan ................................. 5-324533
Dec. 22, 1993 [JP] Japan ................................. 5-324534

[51] Int. Cl.$^6$ ................................................. C08K 3/34
[52] U.S. Cl. .................. 524/493; 523/210; 523/212; 523/213; 523/216
[58] Field of Search ........................... 523/210, 212, 523/213, 216; 524/493

[56] References Cited

U.S. PATENT DOCUMENTS

| | | | |
|---|---|---|---|
| 5,137,955 | 8/1992 | Tsuchiya et al. | 524/493 |
| 5,342,876 | 8/1994 | Abe et al. | 524/493 |
| 5,366,645 | 11/1994 | Sobottka | 252/28 |

FOREIGN PATENT DOCUMENTS

A20524386  1/1993  European Pat. Off. .

*Primary Examiner*—Edward J. Cain
*Attorney, Agent, or Firm*—Cushman Darby & Cushman IP Group of Pillsbury Madison & Sutro, LLP

[57] ABSTRACT

A polypropylene composition which contains a polypropylene and one or more ingredients selected from an antistatic agent and a surface-treated or untreated fine powdery silica gives a propylene stretched film having a well-balanced transparency, slip property and blocking resistance.

20 Claims, No Drawings

POLYPROPYLENE COMPOSITION AND STRETCHED FILM THEREOF

FIELD OF THE INVENTION

The present invention relates to a polypropylene stretched film superior in transparency, slip property and blocking resistance.

BACKGROUND OF THE INVENTION

Polypropylene stretched films have been used in wide variety of fields, including food packaging, textile packaging etc., by virtue of their desirable transparency and mechanical properties.

Although polypropylene stretched films have such desirable properties, they are not entirely free from defects. The major problems are insufficient slip property and blocking resistance.

Various methods have already been proposed to improve the insufficient slip property and blocking resistance of polypropylene stretched films. Such known methods include a method for improving blocking resistance by the addition of zeolite, magnesium silicate, etc. (for example, JP-B-52-16134 and JP-B-48-14423), a method for improving transparency, slip property and blocking resistance by the addition of fine powdery silica (for example, JP-B-63-58170 and JP-A-4-288353), and a method for improving transparency, slip property and blocking resistance by the addition of a thermoplastic synthetic resin which is substantially incompatible with polypropylene (for example, JP-B-50-36262).

However, these methods of adding such inorganic fillers as zeolite, magnesium silicate, fine powdery silica, etc. are not always satisfactory. Thus, increasing the amount of such fillers incorporated into a polypropylene film in order to attain sufficient improvement of the slip property and blocking resistance of the film generally reduces the transparency of the film due to the development of voids caused by the action of the inorganic fillers as the nuclei. As a result, market value of the film is disadvantageously lowered. On the other hand, the addition of the thermoplastic synthetic resin accompanies a problem of unsatisfactory thermal stability of the resin in the course of melt-kneading.

SUMMARY AND OBJECTS OF THE PRESENT INVENTION

The object of the present invention is to develop a polypropylene stretched film which has good transparency, slip property and blocking resistance in combination.

In recognition of the situation, the present inventors have made extensive study to improve the slip property and blocking resistance of polypropylene stretched film without greatly deteriorating its transparency. As the result, it has been found that a polypropylene stretched film which meets the aforesaid object can be obtained by using a specified antistatic agent and/or a specified fine powdery silica. The present invention has been attained on the basis of above finding.

According to the present invention, there are provided:

a polypropylene composition which comprises:
(a) 100 parts by weight of a polypropylene, and
(b) a modifier selected from the group consisting of:
  (i) 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent,
  (ii) 0.2 to 2 parts by weight of an antistatic agent and 0.05 to 1 part by weight of fine powdery silica having a weight average particle diameter of 1.0 to 2.0 µm as determined by the Coulter counter method, a BET specific surface area of 200 to 400 $m^2/g$ and a pore volume of 0.8 ml/g or less, and
  (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent;

a propylene stretched film which comprises:
(a) 100 parts by weight of a polypropylene, and
(b) a modifier selected from the group consisting of:
  (i) 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent,
  (ii) 0.2 to 2 parts by weight of an antistatic agent and 0.05 to 1 part by weight of a fine powdery silica having a weight average particle diameter of 1.0 to 2.0 µm as determined by the Coulter counter method, a BET specific surface area of 200 to 400 $m^2/g$ and a pore volume of 0.8 ml/g or less, and
  (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent; and a method for imparting a well-balanced transparency, slip property and blocking resistance to a polypropylene stretched film which comprises incorporating a modifier selected from the group consisting of:
  (i) 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent,
  (ii) 0.2 to 2 parts by weight of an antistatic agent and 0.05 to 1 part by weight of a fine powdery silica having a weight average particle diameter of 1.0 to 2.0 µm as determined by the Coulter counter method, a BET specific surface area of 200 to 400 $m^2/g$ and a pore volume of 0.8 ml/g or less, and
  (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 $m^2/g$ and a pore volume of 0.8 ml/g or less, with a surface treating agent, into 100 parts by weight of a polypropylene.

When the surface-treated fine powdery silica is added to the polypropylene, the addition of the antistatic agent is not always necessary. When the antistatic agent is added to the polypropylene, the specified fine powdery silica may be used without being necessarily surface-treated. When the antistatic agent is added to the polypropylene and the specified surface-treated fine powdery silica is used, the properties of the resulting film are further enhanced.

The present invention is described further in detail below.

DETAILED DESCRIPTION OF THE INVENTION

The polyproylene used in the present invention is a known crystalline polymer comprising propylene as the main constituent. It refers to crystalline propylene homopolymer or crystalline copolymers of major amount of propylene and minor amount of at least one α-olefin other than propylene. Specific examples of such α-olefin are linear monoolefins (e.g., ethylene, butene-1, pentene-1, hexene-1, heptene-1, octene-1 and decene-1) and branched monoolefins (e.g., 3-methylbutene-1, 3-methylpentene-1 and 4-methylpentene-1). The amount of the α-olefin used is usually 5% by weight or less. The propylene usually has a melt index (MI) of from 0.5 to 20 g/10 min., preferably from 1 to 10 g/10 min.

An example of suitably used polypropylene is a polypropylene having improved stretchability obtained by using a highly active titanium trichloride catalyst and introducing a small amount of ethylene into the polymerization system as disclosed in JP-B-64-6211.

The antistatic agent used in the present invention may be any one which can generally be used for polypropylene films. Specific examples thereof include cationic antistatic agents (e.g., primary amine salts, tertiary amines and quaternary ammonium compounds), anionic antistatic agents (e.g., sulfated oils, sulfated amide oils, sulfated ester oils, fatty alcohol sulfuric ester salts, alkyl sulfuric ester salts, fatty acid ethyl sulfonic acid salts, alkylsulfonic acid salts, alkylnaphthalene-sulfonic acid salts, alkylbenzene-sulfonic acid salts, and phosphoric esters), nonionic antistatic agents (e.g., partial fatty acid esters of polyhydric alcohols, ethylene oxide adducts of fatty alcohols, ethylene oxide adducts of fatty amines or fatty acid amides, ethylene oxide adducts of alkylphenols, ethylene oxide adducts of alkylnaphthols, polyethylene glycol, and fatty acid esters of alkyldiethanolamines) and amphoteric antistatic agents (e.g. carboxylic acid derivatives and imidazoline derivatives). Preferred among them are stearic acid esters of alkyldiethanolamines, and particularly preferred is the stearic acid ester of stearyldiethanolamine.

The amount of the antistatic agent added falls within the range of from 0.2 to 2 parts by weight, preferably from 0.5 to 1 part by weight, relative to 100 parts by weight of the polypropylene. When the amount of the antistatic agent added is less than 0.2 part by weight, the dispersion of the fine powdery silica is poor and the resulting film has poor optical properties. When the amount is higher than 2 parts by weight, though the dispersion of the fine powdery silica is improved, the optical properties of the film are deteriorated due to bleeding of the antistatic agent.

The fine powdery silica used in the present invention has a weight average particle diameter of 1.0 to 2.0 μm, preferably 1.3 to 1.7 μm, as determined by the Coulter counter method. It has a BET specific surface area of 200 to 400 $m^2/g$, preferably 250 to 350 $m^2/g$, and a pore volume of 0.8 ml/g or less, preferably 0.5 ml/g or less, particularly preferably 0.3 ml/g or less.

When the weight average particle diameter of the fine powdery silica is more than 2.0 μm, the transparency of the resulting film is much lowered due to development of voids. When it is less than 1.0 μm, the effect of improving the slip property and blocking resistance is difficultly obtained. When the BET specific surface area is less than 200 $m^2/g$, the effect of improving the slip property and blocking resistance is difficultly obtained. When it is more than 400 $g/m^2$, on the other hand, the transparency is much lowered. When the pore volume is more than 0.8 ml/g, the effect of improving the slip property and blocking resistance is difficultly obtained.

The fine powdery silica used in the present invention may be treated with a surface treating agent, such as paraffin, fatty acids, polyhydric alcohols, silane coupling agents, and silicone oils. Fine powdery silica treated, for example, with such silicone oil as methyl hydrogen polysiloxane and dimethyl polysiloxane or such silane coupling agent as n-decyltrimethoxysilane show improved dispersion in the polypropylene and gives films having good transparency, slip property and blocking resistance.

The weight average particle diameter, BET specific surface area and pore volume of fine powdery silica referred to in the present invention are determined in the following manner.

Weight average particle diameter: this is determined by the Coulter counter method.

BET specific surface area: this is determined by the BET method based on the $N_2$ adsorption at liquid nitrogen saturation temperature.

Pore volume: this is determined by the $N_2$ adsorption method at liquid nitrogen saturation temperature.

The content of the fine powdery silica in the polypropylene falls within the range of from 0.05 to 1 part by weight, preferably from 0.1 to 0.6 part by weight, per 100 parts by weight of the polypropylene.

When the content of the fine powdery silica is less than 0.05 part by weight, the effect of improving the blocking resistance of film is difficult to obtain. When the content is more than 1 part by weight, on the other hand, the transparency of film tends to be poor though the blocking resistance is improved.

The method used for adding the antistatic agent and fine powdery silica to the polyproylene in the present invention is not particularly limited so long as it ensures uniform dispersion of these components. A suitable method, for example, comprises mixing the components with a ribbon blender, Henschel mixer, or the like and then melt-kneading the resulting mixture with an extruder. In this operation, if necessary and desired, antioxidants, neutralizing agents, lubricants, anti-fogging agent and other additives may be incorporated.

The polypropylene stretched film referred to in the present invention is a film stretched at least in one direction by using a tenter or the like. A biaxially stretched film is usually obtained by using a tenter through film formation and stretching in the following manner. Thus, a polypropylene is molten in an extruder, extruded through a T-die and cooled with a cooling roll to solidify it in the form of sheet. The sheet thus obtained is preheated, stretched longitudinally with a number of heating rolls, and then stretched transversally in a heating oven comprising a preheating part, stretching part and heat treating part. If necessary, the thus stretched sheet is subjected to corona treatment and the like. The resulting film is taken up round a reel. The aforesaid melting of polypropylene is usually conducted in the temperature range of from 230° C. to 290° C. though it varies depending on the molecular weight of the polymer. The longitudinal stretching is usually carried out at a temperature of 130° C.–150° C. and at a draw ratio of 4–6. The transversal stretching is usually carried out at a temperature of 150° C.–165° C. and at a draw ratio of 8–10.

The propylene stretched film of the present invention preferably has a thickness of from 10 to 100μ, more preferably from 15 to 50μ.

The present invention is described in more detail below with reference to Examples, which however are merely for the sake of illustration and are not to be construed as limiting the scope of the present invention.

The film properties referred to in the Examples were determined by the following method.

Haze (%): This was determined according to ASTM D-1003.

Scattering-transmitted light intensity (LSI, %): This was determined with an LSI tester (mfd. by Toyo Seiki Seisakusho Ltd.) by receiving scattering-transmitted light in the range of ±0.4° to 1.2°. Since the LSI value corresponded fairly well to the visually observed seethrough clarity, the value was adopted as the measure of seethrough clarity.

Slip property: The static coefficient of friction ($\mu s$) and the kinetic coefficient of friction ($\mu k$) were determined according to ASTM D-1894.

Blocking resistance (kg/12 cm$^2$): Two sheets of film each 120 mm by 30 mm in dimension were placed one upon the other and conditioned under a load of 500 g/(40 mm×30 mm) at 60° C. for 3 hours. Thereafter, the thus conditioned sheets were allowed to stand in an atmosphere of 23° C. and 50% humidity for at least 30 minutes. Then, the resulting sheets were subjected to a shearing tensile test at a peeling rate of 200 mm/min to determine the strength necessary for peeling the sheets.

EXAMPLE 1

One hundred parts by weight of a polypropylene having a melt index of 2.3 g/10 min (Sumitomo Noblen® HS 200A), 1 part by weight of stearic ester of stearyldiethanolamine used as an antistatic agent, 0.3 part by weight of fine powdery silica having a weight average particle diameter of 1.5 μm as determined by the Coulter counter method, a BET specific surface area of 345 m$^2$/g and a pore volume of 0.19 ml/g as determined by the N$_2$ adsorption method, 0.1 part by weight of calcium stearate, 0.2 part by weight of BHT (2,6-di-tertbutylhydroxytoluene) and 0.05 part by weight of Irganox® 1010 (an antioxidant mfd. by Ciba-Geigy Ltd.), respectively used as a stabilizer, were mixed in a Henschel mixer. The resulting mixture was granulated with an extruder of 65 mm bore diameter to form pellets. The pellets obtained were melt-extruded at a resin temperature of 240° C. and then quenched with a cooling roll of 30° C. to solidify into the form of sheet 0.8 mm in thickness. Subsequently, the sheet was preheated. The preheated sheet was longitudinally stretched 5-times at a stretching temperature of 145° C. by making use of the difference of peripheral speeds of the rolls of the longitudinal stretching machine, transversally stretched 8-times at a stretching temperature of 157° C. with a tenter-type stretching machine and heat treated at 165° C. to obtain a stretched film 20 μm in thickness. One side of the stretched film was then corona-treated.

The properties of the film thus obtained were evaluated by the methods described above. The results of evaluation are shown in Table 1.

EXAMPLE 2

The same procedure as in Example 1 was repeated except for changing the amount of fine powdery silica to 0.4 part by weight. The results of evaluation of film properties are shown in Table 1.

EXAMPLES 3 AND 4

The same procedure as in Example 1 was repeated except for replacing the fine powdery silica used in Example 1 by 0.3 part by weight (Example 3) or 0.4 part by weight (Example 4) of a surface-treated fine powdery silica obtained by uniformly mixing 5 parts by weight of methyl hydrogen polysiloxane with 95 parts by weight of the fine powdery silica used in Example 1. The results of evaluation of film properties are shown in Table 1.

EXAMPLE 5

The same procedure as in Example 1 was repeated except for replacing the fine powdery silica used in Example 1 by 0.3 part by weight of a surface-treated fine powdery silica obtained by uniformly mixing 5 parts by weight of dimethylpolysiloxane with 95 parts by weight of the fine powdery silica used in Example 1. The results of evaluation of film properties are shown in Table 1.

EXAMPLE 6

The same procedure as in Example 1 was repeated except for replacing the fine powdery silica used in Example 1 by 0.3 part by weight of a surface-treated fine powdery silica obtained by uniformly mixing 5 parts by weight of n-decyltrimethoxysilane with 95 parts by weight of the fine powdery silica used in Example 1. The results of evaluation of film properties are shown in Table 1.

EXAMPLE 7

The same procedure as in Example 1 was repeated except for replacing the fine powdery silica used in Example 1 by 0.3 part by weight of the fine powdery silica used in Example 3 and omitting the antistatic agent (stearic ester of stearyldiethanolamine). The results of evaluation of film properties are shown in Table 1.

EXAMPLE 8

The same procedure as in Example 1 was repeated except for replacing the fine powdery silica used in Example 1 by 0.4 part by weight of the fine powdery silica used in Example 3 and omitting the antistatic agent (stearic ester of stearyldiethanolamine). The results of evaluation of film properties are shown in Table 1.

COMPARATIVE EXAMPLE 1

The same procedure as in Example 1 was repeated except for omitting the antistatic agent (stearic ester of stearyldiethanolamine). The results of evaluation of film properties are shown in Table 2.

COMPARATIVE EXAMPLE 2

The same procedure as in Example 1 was repeated except for changing the amount of the fine powdery silica to 0.4 part by weight and omitting the antistatic agent (stearic ester of stearyldiethanolamine). The results of evaluation of film properties are shown in Table 2.

COMPARATIVE EXAMPLE 3

The same procedure as in Example 1 was repeated except for replacing the fine powdery silica used in Example 1 by 0.15 part by weight of a fine powdery silica having a weight average particle diameter of 2.7 μm, a pore volume of 0.80 ml/g and a BET specific surface area of 508 m²/g. The results of evaluation of film properties are shown in Table 2.

COMPARATIVE EXAMPLES 4 AND 5

The same procedure as in Example 1 was repeated except for replacing the fine powdery silica used in Example 1 by 0.15 part by weight (Comparative Example 4) or 0.3 part by weight (Comparative Example 5) of a fine powdery silica having a weight average particle diameter of 1.9 μm, a pore volume of 1.25 ml/g and a BET specific surface area of 291 m²/g. The results of evaluation of film properties are shown in Table 2.

COMPARATIVE EXAMPLE 6

The same procedure as in Example 1 was repeated except for replacing the fine powdery silica used in Example 1 by 0.15 part by weight of the fine powdery silica used in Comparative Example 4 and omitting the antistatic agent (stearic ester of stearyldiethanolamine). The results of evaluation of film properties are shown in Table 2.

COMPARATIVE EXAMPLES 7 AND 8

The same procedure as in Example 1 was repeated except for replacing the fine powdery silica used in Example 1 by 0.3 part by weight (Comparative Example 7) or 0.4 part by weight (Comparative Example 8) of a fine powdery silica having a weight average particle diameter of 1.4 μm, a pore volume of 0.08 ml/g and a BET specific surface area of 40 m²/g. The results of evaluation of film properties are shown in Table 2.

COMPARATIVE EXAMPLE 9

The same procedure as in Example 1 was repeated except for replacing the fine powdery silica used in Example 1 by 0.3 part by weight of the fine powdery silica used in Comparative Example 7 and omitting the antistatic agent (stearic ester of stearyldiethanolamine). The results of evaluation of film properties are shown in Table 2.

COMPARATIVE EXAMPLES 10 AND 11

The same procedure as in Example 1 was repeated except for replacing the fine powdery silica used in Example 1 by 0.15 part by weight (Comparative Example 10) or 0.3 part by weight (Comparative Example 11) of a fine powdery silica having a weight average particle diameter of 1.9 μm, a pore volume of 0.80 ml/g and a BET specific surface area of 477 m²/g. The results of evaluation of film properties are shown in Table 2.

COMPARATIVE EXAMPLE 12

The same procedure as in Example 1 was repeated except for replacing the fine powdery silica used in Example 1 by 0.15 part by weight of the fine powdery silica used in Comparative Example 10 and omitting the antistatic agent (stearic ester of stearyldiethanolamine). The results of evaluation of film properties are shown in Table 2.

Tables 1 and 2 reveal that only the use of a specified surface-treated fine powdery silica, the combined use of a specified antistatic agent and fine powdery silica, or the combined use of a specified antistatic agent and a specified surface-treated fine powdery silica impart a good transparency as well as a good slip property and blocking resistance to the obtained films.

According to the present invention, a polypropylene stretched film which is superior in transparency, slip property and blocking resistance is provided from a composition comprising a polypropylene and a specified surface-treated fine powdery silica, a composition comprising a polypropylene, an antistatic agent and a specified fine powdery silica, or a composition comprising a polypropylene, a specified antistatic agent and a specified surface-treated fine powdery silica.

TABLE 1

| | Fine powdery silica | | | | | Anti-static agent | Film properties | | | | |
| | Weight average particle diameter (μm) | Pore volume (ml/g) | Specific surface area (m²/g) | Amount (part by weight) | Surface treatment | Amount (part by weight) | Haze (%) | LSI (%) | Slip property μs | Slip property μk | Blocking resistance (kg/12 cm²) |
|---|---|---|---|---|---|---|---|---|---|---|---|
| Example 1 | 1.5 | 0.19 | 345 | 0.3 | Not done | 1.0 | 1.1 | 2.5 | 0.41 | 0.45 | 1.5 |
| Example 2 | " | " | " | 0.4 | " | " | 1.5 | 2.5 | 0.37 | 0.39 | 0.9 |
| Example 3 | " | " | " | 0.3 | Done | " | 1.7 | 2.6 | 0.32 | 0.34 | 0.9 |
| Example 4 | " | " | " | 0.4 | " | " | 2.4 | 2.8 | 0.31 | 0.33 | 0.6 |
| Example 5 | " | " | " | 0.3 | " | " | 1.7 | 2.7 | 0.34 | 0.37 | 1.0 |
| Example 6 | " | " | " | 0.3 | " | " | 1.9 | 2.7 | 0.38 | 0.43 | 1.3 |
| Example 7 | " | " | " | 0.3 | " | 0 | 2.1 | 2.6 | 0.49 | 0.49 | 0.9 |
| Example 8 | " | " | " | 0.4 | " | " | 2.9 | 2.8 | 0.48 | 0.48 | 0.7 |

TABLE 2

| | Fine powdery silica | | | | | Anti-static agent | Film properties | | | | |
|---|---|---|---|---|---|---|---|---|---|---|---|
| | Weight average particle diameter | Pore volume | Specific surface area | Amount (part by weight) | Surface treatment | Amount (part by weight) | Haze (%) | LSI (%) | Slip property μs | Slip property μk | Blocking resistance (kg/12 cm²) |
| | (μm) | (ml/g) | (m²/g) | | | | | | | | |
| Comparative Example 1 | 1.5 | 0.19 | 345 | 0.3 | Not done | 0 | 3.9 | 3.8 | 0.50 | 0.49 | 0.8 |
| Comparative Example 2 | " | " | " | 0.4 | " | " | 6.0 | 5.2 | 0.47 | 0.46 | 0.6 |
| Comparative Example 3 | 2.7 | 0.80 | 508 | 0.15 | " | 1.0 | 2.9 | 9.0 | 0.53 | 0.49 | 0.7 |
| Comparative Example 4 | 1.9 | 1.25 | 291 | 0.15 | " | " | 3.8 | 6.0 | 2.54 | 1.28 | 1.9 |
| Comparative Example 5 | " | " | " | 0.3 | " | " | 14.2 | 17.3 | 0.68 | 0.61 | 1.2 |
| Comparative Example 6 | " | " | " | 0.15 | " | 0 | 9.4 | 6.0 | 0.51 | 0.57 | 0.8 |
| Comparative Example 7 | 1.4 | 0.08 | 40 | 0.3 | " | 1.0 | 0.7 | 3.5 | Un-measurable | | 2.1 |
| Comparative Example 8 | " | " | " | 0.4 | " | " | 1.6 | 4.5 | 1.29 | 1.51 | 2.1 |
| Comparative Example 9 | " | " | " | 0.3 | " | 0 | 2.7 | 4.6 | 0.64 | 0.65 | 1.0 |
| Comparative Example 10 | 1.9 | 0.80 | 477 | 0.15 | " | 1.0 | 2.5 | 5.2 | 0.92 | 0.67 | 1.6 |
| Comparative Example 11 | " | " | " | 0.3 | " | " | 11.9 | 15.5 | 0.34 | 0.32 | 0.7 |
| Comparative Example 12 | " | " | " | 0.15 | " | 0 | 6.9 | 6.7 | 0.46 | 0.51 | 0.7 |

What is claimed is:

1. A polypropylene composition which comprises:
   (a) 100 parts by weight of a polypropylene, and
   (b) a modifier selected from the group consisting of:
      (ii) 0.2 to 2 parts by weight of an antistatic agent and 0.05 to 1 part by weight of a fine powdery silica having a weight average particle diameter of 1.0 to 2.0 μm as determined by the Coulter counter method, a BET specific surface area of 200 to 400 m²/g and a pore volume of 0.5 ml/g or less, and
      (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 μm as determined by the Coulter counter method, a BET specific surface area of 200 to 400 m²/g and a pore volume of 0.5 ml/g or less, with a surface treating agent.

2. The composition of claim 1, wherein the modifier is modifier (ii).

3. The composition of claim 1, wherein the modifier is modifier (iii).

4. The composition of claim 3, wherein the surface treating agent is a silicone oil or a silane coupling agent.

5. The composition of claim 1, wherein the composition is free from zeolite, magnesium silicate and a thermoplastic synthetic resin which is substantially incompatible with the polypropylene.

6. A polypropylene stretched film which comprises:
   (a) 100 parts by weight of a polypropylene, and
   (b) a modifier selected from the group consisting of:
      (ii) 0.2 to 2 parts by weight of an antistatic agent and 0.05 to 1 part by weight of a fine powdery silica having a weight average particle diameter of 1.0 to 2.0 μm as determined by the Coulter counter method, a BET specific surface area of 200 to 400 m²/g and a pore volume of 0.5 ml/g or less, and
      (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 μm as determined by the Coulter counter method, a BET specific surface area of 200 to 400 m²/g and a pore volume of 0.5 ml/g or less, with a surface treating agent.

7. The film of claim 6, wherein the modifier is modifier (ii).

8. The film of claim 6, wherein the modifier is modifier (iii).

9. The film of claim 8, wherein the surface treating agent is a silicone oil or a silane coupling agent.

10. The film of claim 6, wherein the film is free from zeolite, magnesium silicate and a thermoplastic synthetic resin which is substantially incompatible with the polypropylene.

11. A method for imparting a well-balanced combination of transparency, slip property and blocking resistance to a polypropylene stretched film which comprises incorporating a modifier selected from the group consisting of:
   (ii) 0.2 to 2 parts by weight of an antistatic agent and 0.05 to 1 part by weight of a fine powdery silica having a weight average particle diameter of 1.0 to 2.0 μm as determined by the Coulter counter method, a BET specific surface area of 200 to 400 m²/g and a pore volume of 0.5 ml/g or less, and
   (iii) 0.2 to 2 parts by weight of an antistatic agent and 0.05 to 1 part by weight of a surface-treated fine powdery silica obtained by surface-treating a fine powdery silica having a weight average particle diameter of 1.0 to 2.0 µm as determined by the Coulter counter method, a BET specific surface area of 200 to 400 m²/g and a pore volume of 0.5 ml/g or less, with a surface treating agent, into 100 parts by weight of a polypropylene.

12. The method of claim 11, wherein the modifier is modifier (ii).

13. The method of claim 11, wherein the modifier is modifier (iii).

14. The method of claim 13, wherein the surface treating agent is a silicone oil or a silane coupling agent.

15. A propylene composition according to claim 1, wherein the pore volume of the modifier is 0.3 ml/g or less.

16. A polypropylene composition according to claim 15, wherein the pore volume is 0.19 ml/g.

17. A polypropylene stretched film according to claim 6, wherein the pore volume of the modifier is 0.3 ml/g or less.

18. A method according to claim 11, wherein the modifier has a pore volume of 0.3 ml/g or less.

19. A polypropylene composition according to claim 1, wherein the fine powdery silica has a weight average particle diameter of 1.3 to 1.7 µm.

20. A polypropylene composition according to claim 1, wherein the content of the fine powdery silica in said composition is 0.1 to 0.6 part by weight, per 100 parts by weight of the polypropylene.

* * * * *